(12) United States Patent
Shumiya et al.

(10) Patent No.: US 11,095,791 B2
(45) Date of Patent: Aug. 17, 2021

(54) READING APPARATUS

(71) Applicant: Brother Kogyo Kabushiki Kaisha, Nagoya (JP)

(72) Inventors: Kazushi Shumiya, Konan (JP); Kentaro Aoyama, Nagoya (JP); Seiya Sato, Yokkaichi (JP); Kunihiro Amano, Kitanagoya (JP); Jie Zheng, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/808,685

(22) Filed: Mar. 4, 2020

(65) Prior Publication Data
US 2020/0314277 A1 Oct. 1, 2020

(30) Foreign Application Priority Data
Mar. 29, 2019 (JP) .............................. JP2019-066634

(51) Int. Cl.
*H04N 1/08* (2006.01)
*H04N 1/00* (2006.01)

(52) U.S. Cl.
CPC ..... *H04N 1/00803* (2013.01); *H04N 1/00809* (2013.01); *H04N 1/00824* (2013.01)

(58) Field of Classification Search
CPC .................. H04N 1/00803; H04N 1/00809
See application file for complete search history.

(56) References Cited

U.S. PATENT DOCUMENTS

| 2006/0023267 A1* | 2/2006 | Ikeno | ............... H04N 1/00997 |
| | | | 358/474 |
| 2018/0288237 A1* | 10/2018 | Akagi | ............... H04N 1/00018 |

FOREIGN PATENT DOCUMENTS

| JP | H04-94858 U | 8/1992 |
| JP | 2002-354206 A | 12/2002 |
| JP | 2006-065289 A | 3/2006 |
| JP | 2007-221730 A | 8/2007 |

* cited by examiner

Primary Examiner — Ibrahim Siddo
(74) Attorney, Agent, or Firm — Burr & Brown, PLLC

(57) ABSTRACT

A reading apparatus, having a document placement plate, a reader, a driving device, a cover, and a controller, is provided. The cover includes an alignment part and a protrusive part. The protrusive part includes an uneven surface and first and second edges forming outer edges of the uneven surface extending in a main scanning direction and in a sub-scanning direction, respectively. The controller is configured control the driving device to move the reader in the sub-scanning direction and the reader while being moved to read the protrusive part, and detect the first edge and the second edge in image data of the protrusive part read by the reader based on an image of the uneven surface and determine a reading range for the reader in the document placement plate based on positions of the first edge and the second edge.

8 Claims, 4 Drawing Sheets

READING APPARATUS

CROSS REFERENCE TO RELATED APPLICATION

This application claims priority from Japanese Patent Application No. 2019-066634, filed on Mar. 29, 2019, the entire subject matters of which are incorporated herein by reference.

BACKGROUND

Technical Field

An aspect of the present disclosure is related to a reading apparatus.

Related Art

A flatbed (FB) reading apparatus capable of reading an original document placed on a transparent document placement plate is known. The reading apparatus may have a reader arranged at a position underneath the transparent document placement plate. The reader may read a line, extending along a main scanning direction, in the original document and move in a sub-scanning direction to read further lines of the original document. Thus, by reading the original document line by line, an image in a reading range in the original document placed on the document placement plate may be read.

In the known reading apparatus, the reader needs an origin point for the reading range to be set. In the conventional reading apparatus, for example, the reader may be provided with a detectable piece, and a FB cover enclosing the document placement plate may be provided with a photo-interrupter to detect the detectable piece passing thereby so that the origin point may be set based on a position of the reader when the photo-interrupter detects the detectable piece passing thereby. For another example, a white reference part and a black reference part may be arranged side-by-side along an sub-scanning direction, which is a movable direction for a carriage, so that an image sensor on the carriage may read the white reference part and the black reference part, and a position of a boundary between the white reference part and the black reference part may be set as the origin point.

SUMMARY

Between these options, in light of manufacturing cost and assembling load, the latter configuration with the white reference part and the black reference part may be employed more advantageously than the former configuration with the photo-interrupter. In particular, in view of an advantage in manufacturing cost, the white reference part and the black reference part may be formed of a piece of tape having a white area and a black area adhered to a downward surface of the FB cover. In this configuration, however, the white reference part and the black reference part may be adhered to a position displaced from a correct position.

In order to allow this displacement of the white reference part and the black reference part, reading apparatuses may often be configured such that the reader may not necessarily read a part of the original document ranging for several millimeters from a leading edge thereof. However, users may have a desire that the reading apparatus should be able to read the entire or a larger part of the original document. In consideration of the users' desire, a reading range in an original document may be expanded by setting a starting position for the reading range on the document placement plate at a position in proximity to a reference position, at which the original document to be read may be correctly located. Yet, in this configuration, due to the displacement of the adhesive tape on the FB cover, a part of the original document may not be read correctly.

The present disclosure is advantageous in that a reading apparatus, in which a reader may read an original document to an extent closer to a leading edge of the original document, is provided.

According to an aspect of the present disclosure, a reading apparatus, having a document placement plate, a reader, a driving device, a cover, and a controller, is provided. The document placement plate has a flat plane, on which an original document is placed. The reader is arranged on a side of the document placement plate opposite to the flat plane. The reader is configured to move in a sub-scanning direction and read a line extending in a main scanning direction. The main scanning direction extends orthogonally to the sub-scanning direction. The driving device is configured to move the reader in the sub-scanning direction. The cover is arranged around peripheries of the document placement plate to support the document placement plate. The cover includes an alignment part and a protrusive part. The alignment part, with which an edge of the original document is placed to align by contact, extends linearly in the main scanning direction. The protrusive part includes an uneven surface, a first edge forming an outer edge of the uneven surface and extending linearly in the main scanning direction, and a second edge forming another outer edge of the uneven surface and extending linearly in the sub-scanning direction. The controller is configured to control the driving device to move the reader in the sub-scanning direction and the reader to read the protrusive part while being moved, and detect the first edge and the second edge in image data of the protrusive part read by the reader based on an image of the uneven surface and determine a reading range for the reader in the document placement plate based on positions of the first edge and the second edge.

BRIEF DESCRIPTION OF THE ACCOMPANYING DRAWINGS

DETAILED DESCRIPTION

In the following paragraphs, described with reference to the accompanying drawings will be an embodiment of the present disclosure. It is noted that various connections may be set forth between elements in the following description. These connections in general and, unless specified otherwise, may be direct or indirect and that this specification is not intended to be limiting in this respect. It will be understood that those skilled in the art will appreciate that there are numerous variations and permutations of a reading apparatus that fall within the spirit and scope of the invention.

<Configuration of Multifunction Peripheral>

Figure 1:
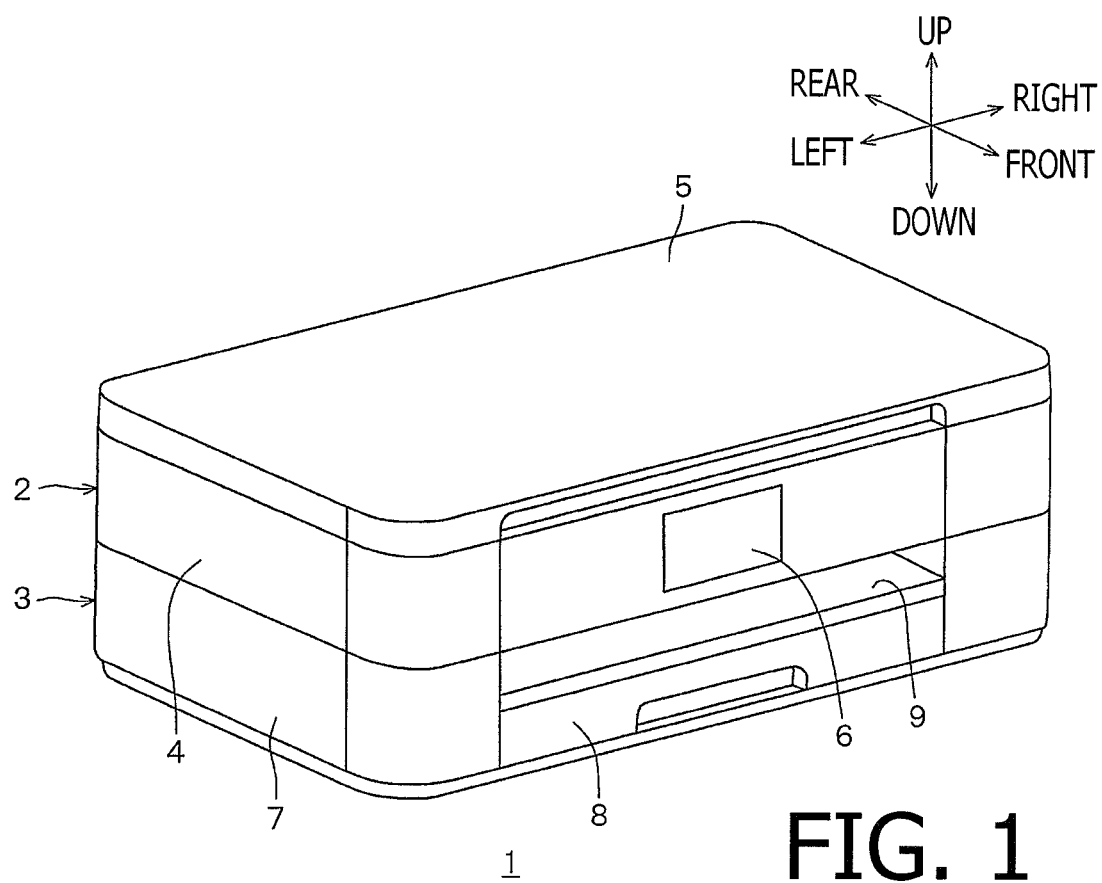
FIG. 1 is a perspective view of a multifunction peripheral having a reading apparatus according to an embodiment of the present disclosure.

A multifunction peripheral (MFP) 1 shown in FIG. 1 is an electronic device having a plurality of functions including a reading function and a printing function. The reading function is a function to read an image of an object and create image data related to the read image. The printing function is a function to form an image related to image data on a sheet. The MFP 1 includes a reading apparatus 2 to provide the reading function and a printing apparatus 3 to provide the printing function.

The reading apparatus 2 is arranged on top of the printing apparatus 3. The reading apparatus 2 includes a casing 4 and a document cover 5. The reading apparatus 2 has an approximate shape of a rectangular solid. The document cover 5 is movable between an open position and a closed position. When the document cover 5 is located at the open position, an upper face of the casing 4 is exposed. When the document cover 5 is located at the closed position, the document cover 5 covers the upper face of the casing 4.

On one side of the casing 4, arranged is an operation panel 6. With regard to the MFP 1, the side, on which the operation panel 6 is arranged, will be called as a front side. The operation panel 6 may be, for example, a touch panel, and a user may enter settings and commands for reading a document through the operation panel 6.

In the following paragraphs, positional relation within the MFP 1 and each part or item included in the MFP 1 will be mentioned on basis of an orientation of a user facing the front side of the MFP 1, as indicated by arrows in FIGS. 1, 2, and 3A-3B. In other words, a right-hand side and a left-hand side to the user who faces the front side of the MFP 1 are defined as a rightward side and a leftward side, respectively. A right-to-left or left-to-right direction may be called as a widthwise direction, a front-to-rear or rear-to-front direction may be called as a front-rear direction, and a direction orthogonal to the widthwise direction and the front-rear direction may be called as an up-down direction or a vertical direction. An upper side and a lower side of the MFP 1 will be referred to based on a condition, in which the MFP 1 is set on a horizontal plane.

The printing apparatus 3 has a casing 7, a feeder tray 8, and an ejection tray 9. The feeder tray 8 is movable to be drawn outward from or pushed into the casing 7 through the front side. The feeder tray 9 may store and support a stack of sheets therein. The ejection tray 9 is arranged to form an upper face of the casing 7. The sheets may be fed from the feeder tray 8 one by one and conveyed inside the casing 7 to the ejection tray 9. Inside the casing 7, arranged is a printer (not shown), which may form images, either multicolored or monochrome images, on the sheets being conveyed in the casing 7. The printer may form images in, for example, electro-photographic printing or in inkjet printing.

Figure 2:
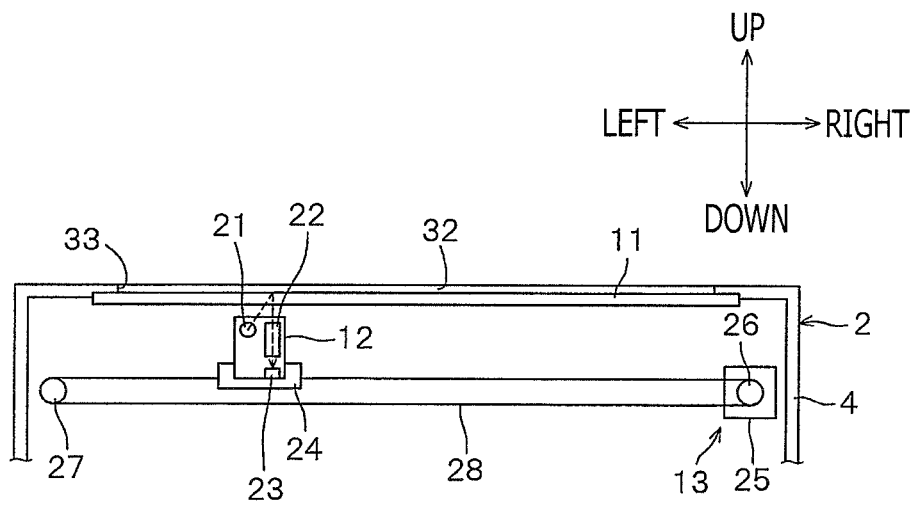
FIG. 2 is an illustrative cross-sectional view of the reading apparatus according to the embodiment of the present disclosure.

On an upper side of the casing 4 of the reading apparatus 2, formed is a rectangular upper opening, as shown in FIG. 2, which has edges extending in the front-rear direction and the widthwise direction. The upper opening is closed by a document placement plate 11 from below. The document placement plate 11 is a plate formed of a transparent material and may be, for example, a glass plate. At least an upper surface of the document placement plate 11 forms a flat plane. The document placement plate 11 is supported by peripheral portions of the casing 4 around the upper opening at peripheries thereof.

Underneath the document placement plate 11, arranged are a contact image sensor (CIS) unit 12 and a moving mechanism 13.

The CIS unit 12 is provided with a light source 21, a rod lens array 22, and an image sensor 23. The light source 21 may emit linear light extending in the front-rear direction at the document placement plate 11. The image sensor 23 may be, for example, a linear image sensor, having a plurality of light receiving elements arrayed in a main scanning direction, which coincides with the front-rear direction for the reading apparatus 2.

The light emitted from the light source 21 may reflect on a surface of a readable object and may enter the image sensor 23 through the rod lens array 22. As the light enters the image sensor 23, the light receiving elements in the image sensor 23 may output photoelectrically converted voltages. The voltages output from the light receiving elements may be amplified through a gain control circuit and converted through an A/D conversion circuit into digital pixel values. The A/D conversion circuit may have a resolution of, for example, 8 bit (0-255) and converts voltages which are lower than a lower criterion voltage, or a lower limit value, uniformly into zero (0), and voltages which are higher than a higher criterion voltage, or an upper limit value, uniformly into 255. Meanwhile, voltages which fall in a range between the lower limit value and the upper limit value are converted by the A/D conversion circuit into pixel values corresponding to largeness of the respective voltages. Thus, a line of the readable object may be read along the main scanning direction.

The moving mechanism 13 may move the CIS unit 12 in a sub-scanning direction, e.g., the widthwise direction, which intersects orthogonally with the main scanning direction. The moving mechanism 13 includes a carriage 24, on which the CIS unit 12 is mounted, a motor 25 including a bi-directionally rotatable stepping motor, a driving pulley 26 which may be driven by the motor 25 to rotate, a driven pulley 27 paired with the driving pulley 26, and a belt 28 strained between the driving pulley 26 and the driven pulley 27. The driving pulley 26 is located at a rightward end area in the casing 4 in an arrangement such that a rotation axis thereof extends in the front-rear direction. The driven pulley 27 is located at a leftward end area in the casing 4 in an arrangement such that a rotation axis thereof extends in the front-rear direction. The carriage 24 is attached to the belt 28. The belt 28 may roll as the driving pulley 26 rotates, and the carriage 24 may move in the sub-scanning direction, which coincides with the widthwise direction in the reading apparatus 2.

In order read the original document, the document cover 5 may be placed in the open position, and the original document may be placed on the document placement plate 11. In particular, the original document may be placed in such an arrangement that a leftward edge thereof contacts an edge 31 on the left of the upper opening in the casing 4, i.e., an edge of the upper opening facing right, and a rear edge thereof contacts an edge 32 of the upper opening on the rear, i.e., an edge of the upper opening facing front. In this regard, the edge 31 on the left of the upper opening may serve as an alignment part, with which the edge of the original document may be placed to align by contact. After placing the original document in this arrangement, the document cover 5 may be placed in the closed position so that the original document may be covered by the document cover 5 from above. Thereafter, when a command to start reading the original document is entered through the operation panel 6, the CIS unit 12 may read a surface of the original document that contacts the document placement plate 11 and may be moved by the moving mechanism 13 in the sub-scanning direction to read the original document line by line.

Figure 3A:
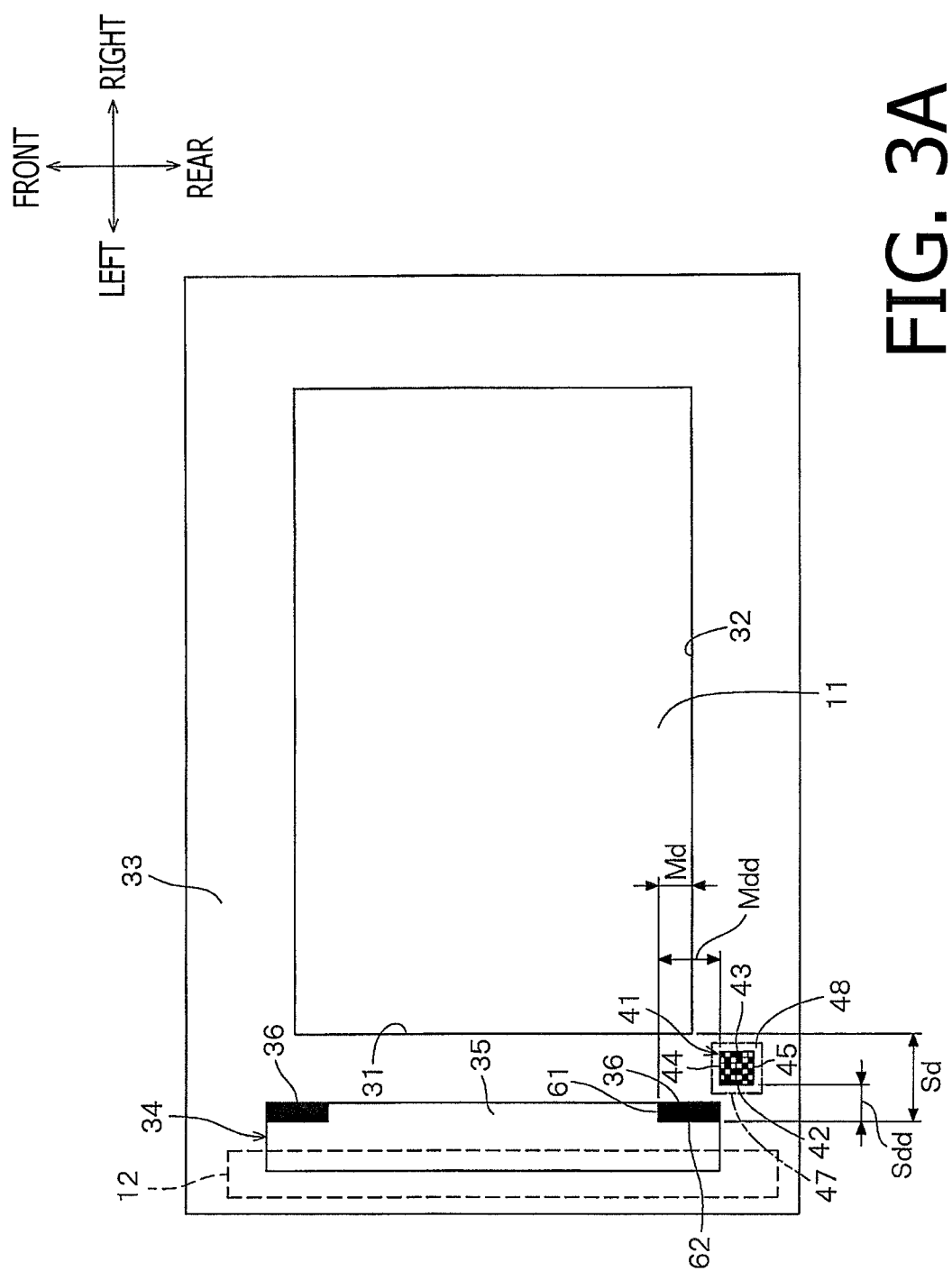
FIG. 3A is a plan view of the reading apparatus according to the embodiment of the present disclosure viewed upward from a lower position.

Meanwhile, on a ceiling of the casing 4, i.e., a downward face 33 at a peripheral area surrounding the upper opening in the casing 4, as shown in FIG. 3A, arranged at a leftward position with respect to the document placement plate 11 is a white-black reference part 34. The white-black reference part 34 is formed of a piece of tape, which is adhered to the downward face 33 and arranged to longitudinally extends in the main scanning direction which coincides with the front-rear direction. The white-black reference part 34 has a white area 35, which occupies a larger or most part of the white-black reference part 34, and a rectangular black area 36, which is arranged at each corner on a rightward edge of the white-black reference part 34 extending in the front-rear direction. In this arrangement, in a frontward end region and a rearward end region on the rightward edge of the white-black reference part 34, the black area 36 and the white area 35 adjoin each other along the sub-scanning direction. In other words, along the rightward edge of the white-black reference part 34 extending in the front-rear direction, the white area 35 is interposed between the black areas 36.

Figure 3B:
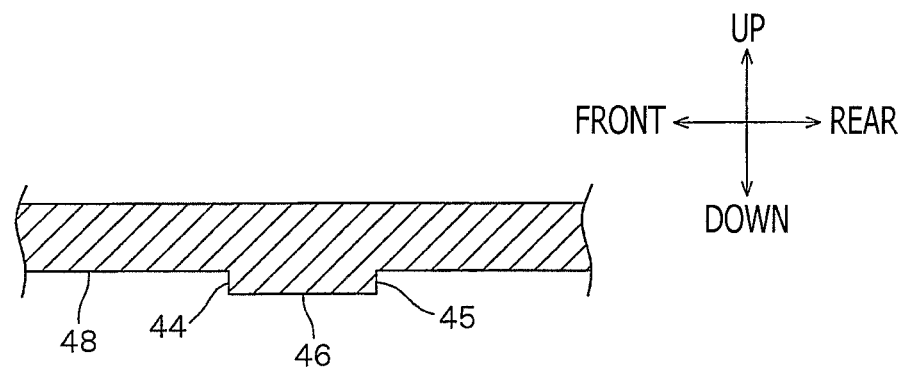
FIG. 3B is a cross-sectional view of a part of a casing of the reading apparatus according to the embodiment of the present disclosure.

On the downward face 33, formed between the document placement board 11 and the white-black reference part 34 in the sub-scanning direction is a protrusive part 41. An amount of the protrusive part 41 to protrude downward from the downward face 33 may be, for example, between 0.1 mm and 0.2 mm, so that the protrusive part 41 may avoid interfering in a course of the CIS unit 12 that moves in the sub-scanning direction to read a line. The protrusive part 41 is formed in a rectangular shape having a pair of longitudinal edges 42, 43, which extend in the main scanning direction, and a pair of crosswise edges 44, 45, which extend in the sub-scanning direction. The protrusive part 41 has an uneven surface 46, in which protrusions and recesses with height differences of approximately 50-80 μm are formed, in a region enclosed by the longitudinal edges 42, 43 and the crosswise edges 44, 45. Moreover, as shown in FIGS. 3A-3B, the downward face 33 has a flat surface 48 formed to be flat at least in a rectangular range 47, of which outlines are apart from the longitudinal edges 42, 43 and the crosswise edges 44, 45 to surround the protrusive part 41.

Figure 4:
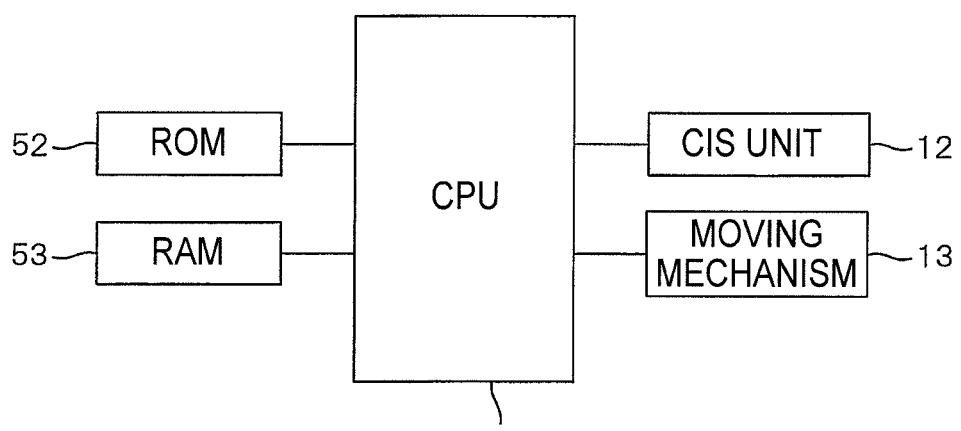
FIG. 4 is a block diagram to illustrate an electric configuration of the reading apparatus according to the embodiment of the present disclosure.

The reading apparatus 2 further includes, as shown in FIG. 4, a central processing unit (CPU) 51, a read only memory (ROM) 52, and a random access memory (RAM) 53.

The CPU 51 executes programs for processing various types of information to control actions of components in the reading apparatus 2 including the CIS unit 12 and the moving mechanism 13.

The ROM 52 includes a rewritable non-volatile memory such as a flash memory. The ROM 52 may store programs and data that may be executed or processed by the CPU 51.

The RAM 43 includes a volatile memory including, for example, dynamic random access memory (DRAM) and may serve as a work area when the CPU 51 executes the programs. The RAM 53 forms a step counter, which may increment a number of steps by one (1) each time the motor 25 rotates for a step. The CPU 51 may control the operation of the motor 25 based on the number of steps counted by the step counter to control the position of the CIS unit 12.

<Reading Range Determining Process>

In the white-black reference part 34 in the reading apparatus 2, as shown in FIG. 3A, the white area 35 and the black areas 36 adjoin one another along the main scanning direction and the sub-scanning direction; therefore, the white-black reference part 34 has a boundary 61 extending in the sub-scanning direction between the white area 35 and the black area 36 which adjoin each other along the main scanning direction, and a boundary 62 extending in the main scanning direction between the white area 35 and the black area 36 which adjoin each other along the sub-scanning direction. With reference to a position of these boundaries 61, 62 at one end of the white-black reference part 34 in the main scanning direction, a starting position of a reading range, at which the reading apparatus 2 may start reading the original document placed on the document placement plate 11, may be set, and the reading range may be set based on the starting position. In this regard, however, while the white-black reference part 34 is adhered to the downward face 33 of the casing 4 manually, the white-black reference part 34 may sometimes be adhered to a position displaced from a correct position.

Figure 5:
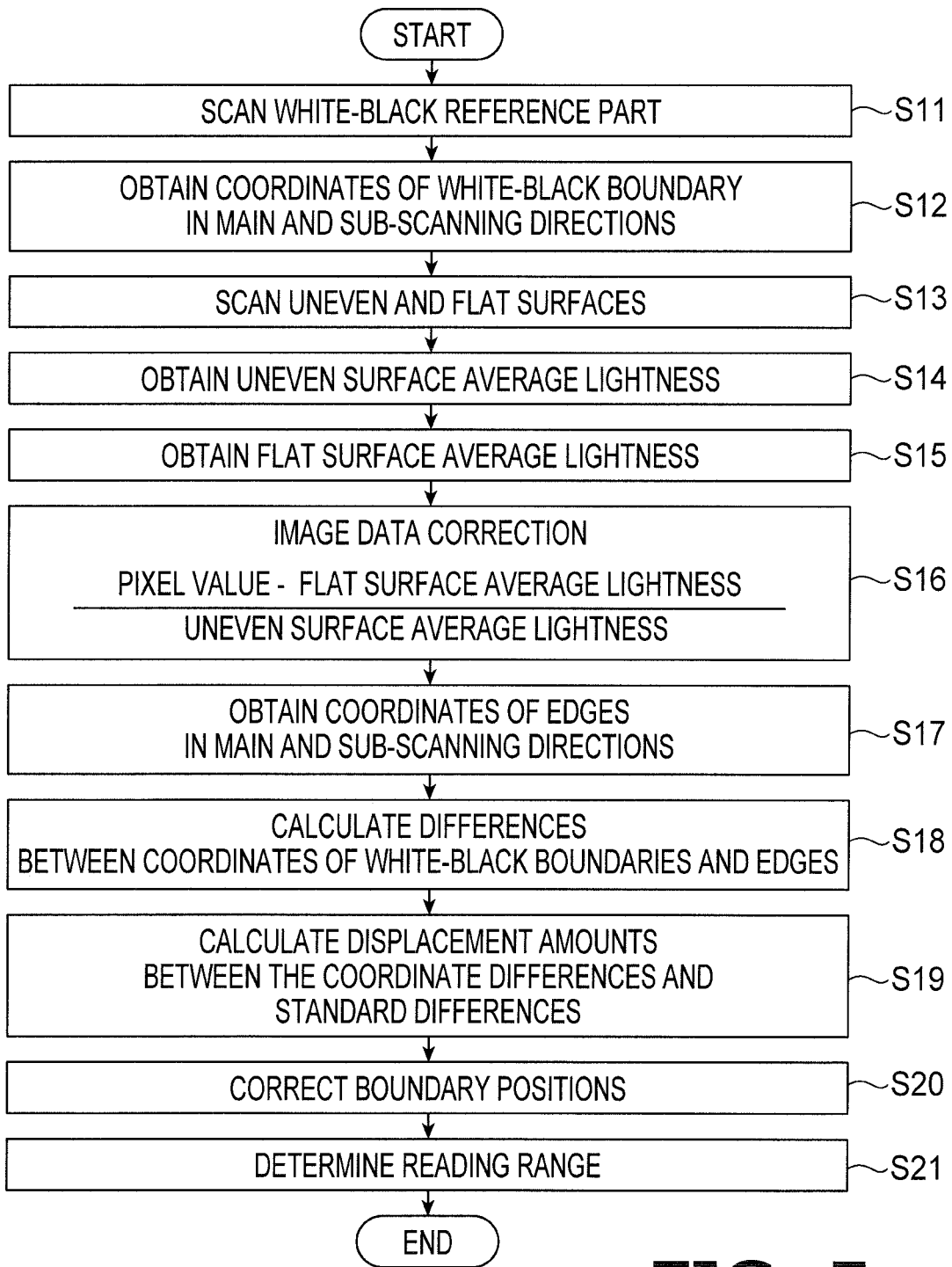
FIG. 5 is a flowchart to illustrate a flow of steps to be executed in a reading range determining process in the reading apparatus according to the embodiment of the present disclosure.

Therefore, through the reading range determining process, as shown in FIG. 5, which is executed by the CPU 51 to determine the reading range for the original document, positions of the boundaries 61, 62 in the white-black reference part 34 may be corrected.

In the reading range determining process, in particular, in S11, the CPU 51 controls the moving mechanism 13 to move the CIS unit 12 in the sub-scanning direction and controls the CIS unit 12 to read an image of an area containing the white-black reference part 34. In S12, the CPU 51 obtains coordinates of the boundary 61 in the main scanning direction between the white area 35 and the black area 36 and coordinates of the boundary 62 in the sub-scanning direction between the white area 35 and the black area 36 from image data generated from the image having been read in S11. The coordinates of the boundaries 61, 62 indicate positions of the boundaries 61, 62 in an orthogonal coordinate system, having an arbitrary line extending in the main scanning direction and an arbitrary line extending in the sub-scanning direction as coordinate axes and an origin at an intersection between the arbitrary lines. In the following paragraphs, the term "coordinates" will refer to a position in the same orthogonal coordinate system.

In S13, the CPU 51 controls the CIS unit 12 to read an area containing the range 47 on the downward face 33 of the casing 4. Thereby, the uneven surface 46 in the protrusive part 41 and the flat surface 48 in the range 47 are read by the CIS unit 12. Meanwhile, the CIS 12 is continuously moved in the sub-scanning direction without stopping since the CIS unit 12 started reading the white-black reference part 34 in S11.

Following the reading action to read the range 47 in S13, in S14, the CPU 51 obtains an uneven surface average lightness, or an uneven surface output average value, which is average lightness, i.e., average of the pixel values, in the uneven surface 46 read by the CIS unit 12, through calculation. Moreover, in S15, the CPU 51 obtains a flat surface average lightness, or a flat surface output average value, which is average lightness, i.e., average of the pixel values, in the flat surface 48 read by the CIS unit 12, through calculation. Thereafter, in S16, the CPU 51 subtracts the flat surface average lightness from each of the pixel values in the range 47 having been read by the CIS unit 12 and multiplies the subtracted differences by a reciprocal of the uneven surface average lightness to correct the pixel values in the range 47 having been read by the CIS unit 12.

Thereafter, in S17, the CPU 51 sets a value between the uneven surface average lightness and the flat surface average lightness as a threshold value and obtains coordinates of a position, of which pixel value is substantially larger than a pixel value of an adjoining pixel in the main scanning direction to leap over the threshold value, as a position of the crosswise edge 44, and coordinates of a position, of which pixel value is substantially larger than a pixel value of an adjoining pixel in the sub-scanning direction to leap over the threshold value, as a position of the longitudinal edge 42.

In S18, the CPU 51 calculates a difference between the coordinates of the boundary 61 and the coordinates of the crosswise edge 44 to obtain a coordinate difference as a main scanning direction difference Mdd. Moreover, the CPU 51 calculates a difference between the coordinates of the boundary 62 and the coordinates of the longitudinal edge 42 to obtain a coordinate difference as a sub-scanning direction difference Sdd.

Meanwhile, the ROM 52 stores a main scanning direction standard difference, which is an ideal difference based on designed values between the coordinates of the boundary 61 and the coordinates of the crosswise edge 44, and a sub-scanning direction standard difference, which is an ideal difference based on designed values between the coordinates of the boundary 62 and the coordinates of the longitudinal edge 42. In S19, the CPU 51 subtracts the main scanning direction standard difference from the main scanning direction difference Mdd and obtains the subtracted difference as a main scanning direction displacement amount. Moreover, the CPU subtracts the sub-scanning direction standard difference from the sub-scanning direction difference Sdd and obtains the subtracted difference as a sub-scanning direction displacement amount.

In S20, the CPU 51 subtracts the main scanning direction displacement amount from the coordinates of the boundary 61 and sets the subtracted difference as corrected coordinates of the boundary 61. Moreover, the CPU 51 subtracts the sub-scanning direction displacement amount from the coordinates of the boundary 62 and sets the subtracted difference as corrected coordinates of the boundary 62.

Meanwhile, the ROM 52 stores a distance Md, which is an ideal distance based on designed values between the boundary 61 and the rear edge 32 of the upper opening in the main scanning direction, and a distance Sd, which is an ideal distance based on designed values between the boundary 62 and the edge 31 on the left of the upper opening in the sub-scanning direction. In S21, the CPU 51 determines a point, which is apart from the corrected coordinate of the boundary 61 in the main scanning direction for the distance Md and apart from the corrected coordinate of the boundary 62 in the sub-scanning direction for the distance Sd, as the starting position. In other words, the CPU 51 determines a point defined by a position, which is apart from the longitudinal edge 42 in the sub-scanning direction for a first distance (Sd-Sdd), and a position, which is apart from the crosswise edge 44 in the main scanning direction for a second distance (Mdd-Md), to be the starting position of the reading range. Thereafter, the CPU 51 determines the reading range with reference to the starting position and ends the reading range determining process.

<Benefits>

As described above, the casing 4 to support the document placement plate 11 has the upper opening, which has the edge 31 on the left. The edge 31 on the left may serve as the alignment part, with which the leading edge of the original document may be placed to align by contact, and the original document may be placed on the document placement plate 11 with reference to the position of the edge 31 on the left. Moreover, the casing 4 has the protrusive part 41. In order to determine the reading range for the CIS unit 12, the CIS unit 12 reads the protrusive part 41, and the longitudinal edge 42 of the protrusive part 41 extending linearly in the main scanning direction and the crosswise edge 44 of the protrusive part 41 extending linearly in the sub-scanning direction are detected in the image data generated from the image read by the CIS unit 12. Based on the positions of the longitudinal edge 42 and the crosswise edge 44, reading range for the CIS unit 12 is determined. In this regard, while the edge 31 on the left and the protrusive part 41 are formed in the same casing 4, the positional relation between the edge 31 and the protrusive part 41 is steady. By determining the reading range for the CIS unit 12 based on the positions of the longitudinal edge 42 and the crosswise edge 44 of the protrusive part 41, an edge of the reading range may be set at a position in proximity to the edge 34 being the alignment part. Therefore, the CIS unit 12 may be enabled to read a larger range in the original document to an extent closer to the leading edge of the original document.

In order to obtain the positions, or the coordinates, of the longitudinal edge 42 and the crosswise edge 44, the flat surface average lightness is subtracted from each of the pixel values in the range 47 having been read by the CIS unit 12, and the subtracted differences are multiplied by the reciprocal of the uneven surface average lightness to correct the pixel values in the range 47. Through this correction, the pixels that form the longitudinal edges 42, 43 and the crosswise edges 44, 45 of the protrusive part 41 may be clearly highlighted, and the positions of the longitudinal edge 42 and the crosswise edge 44 may be obtained correctly.

<More Examples>

Although an example of carrying out the invention has been described, those skilled in the art will appreciate that there are numerous variations and permutations of the recording apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the CPU 51 may not necessarily be a single CPU in the reading apparatus 2 to execute the programs or the processes, but the reading apparatus 2 may have a plurality of CPUs, which may cooperate with one another to execute the programs and processes.

For another example, the reading apparatus 2 may not necessarily be incorporated in the MFP 1 but may be configured as a single and independent reading apparatus.

What is claimed is:

1. A reading apparatus, comprising:
   a document placement plate comprising a flat plane, on which an original document is placed;
   a reader arranged on a side of the document placement plate opposite to the flat plane, the reader being configured to move in a sub-scanning direction and read a line extending in a main scanning direction, the main scanning direction extending orthogonally to the sub-scanning direction;
   a driving device configured to move the reader in the sub-scanning direction;

a cover arranged around peripheries of the document placement plate to support the document placement plate, the cover comprising:
an alignment part, with which an edge of the original document is placed to align by contact, the alignment part extending linearly in the main scanning direction; and
a protrusive part, comprising:
an uneven surface;
a first edge forming an outer edge of the uneven surface, the first edge extending linearly in the main scanning direction; and
a second edge forming another outer edge of the uneven surface, the second edge extending linearly in the sub-scanning direction; and
a controller configured to:
control the driving device to move the reader in the sub-scanning direction and the reader to read the protrusive part while being moved; and
detect the first edge and the second edge in image data of the protrusive part read by the reader based on an image of the uneven surface and determine a reading range for the reader in the document placement plate based on positions of the first edge and the second edge.

2. The reading apparatus according to claim 1,
wherein a face of the cover facing opposite to the flat plane forms a flat surface at a part in a range to be read by the reader reading the protrusive portion excluding the protrusive part;
wherein the controller is configured to obtain correction image data by:
calculating an uneven surface output average value being an average of values output from the reader reading the uneven surface and a flat surface output average value being an average of values output from the reader reading the flat surface;
subtracting the flat surface output average value from each value in pixels in the image data; and
multiplying each subtracted value of the pixels in the image data by a reciprocal of the uneven surface output average value.

3. The reading apparatus according to claim 2,
wherein the controller is configured to specify the positions of the first edge and the second edge with use of the correction image data and based on a threshold value being a value between the uneven surface output average value and the flat surface output average value.

4. The reading apparatus according to claim 3,
wherein the controller is configured to set a point defined by a position, which is apart for a first distance in the sub-scanning direction from the specified position of the first edge, and a position, which is apart for a second distance in the main scanning direction from the specified position of the second edge, to be a starting point of the reading range to be read by the reader.

5. The reading apparatus according to claim 3, further comprising:
a white-black reference part to be read by the reader, the white-black reference part including a white area and a black area, the white-black reference part being located at a position to avoid interfering in the reader reading the original document.

6. The reading apparatus according to claim 5,
wherein the white area and the black area adjoin each other along the main scanning direction and along the sub-scanning direction in a region at an end of the white-black reference part in the main scanning direction.

7. The reading apparatus according to claim 6,
wherein the controller is configured to:
detect a position of a boundary between the white area and the black area in the main scanning direction and a position of a boundary between the white area and the black area in the sub-scanning direction in image data of the white-black reference part read by the reader;
calculate a sub-scanning direction difference, the sub-scanning direction difference being a difference between the specified position of the first edge and the detected position of the boundary in the sub-scanning direction, and a main scanning direction difference, the main scanning direction difference being a difference between the specified position of the second edge and the detected position of the boundary in the main scanning direction;
calculate a displacement amount in the main scanning direction between the calculated main scanning direction difference and a predetermined main scanning direction standard difference and a displacement amount in the sub-scanning direction between the calculated sub-scanning direction difference and a predetermined sub-scanning direction standard difference; and
correct the detected position of the boundary in the main scanning direction and the detected position of the boundary in the sub-scanning direction according to the calculated displacement amount in the main scanning direction and the calculated displaced amount in the sub-scanning direction, and
wherein the controller is configured to determine the reading range for the reader based on the corrected position of the boundary in the main scanning direction and the corrected position of the boundary in the sub-scanning direction.

8. The reading apparatus according to claim 7,
wherein, after correcting the detected position of the boundary in the main scanning direction and the detected position of the boundary in the sub-scanning direction, the controller is configured to determine the reading range based on the corrected position of the boundary in the main scanning direction and the corrected position of the boundary in the sub-scanning direction without specifying the positions of the first edge and the second edge.

* * * * *